(No Model.)
A. B. SIMONDS.
MEASURING PUMP.
No. 336,761. Patented Feb. 23, 1886.
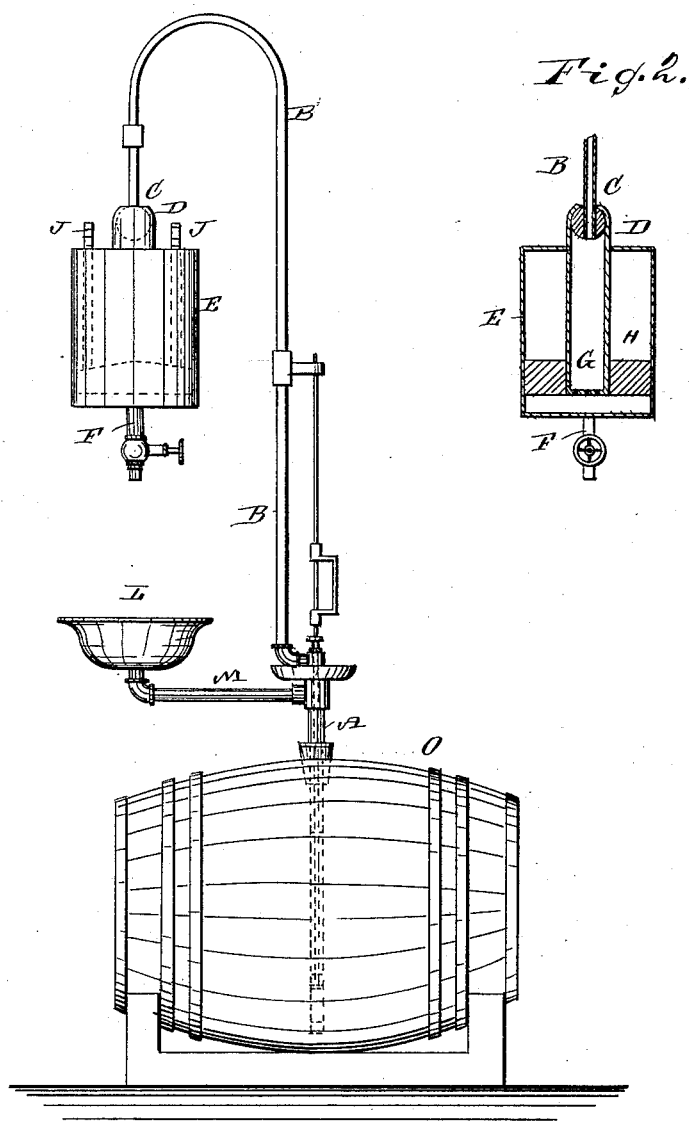
WITNESSES:
INVENTOR:
A. B. Simonds
BY Munn & Co
ATTORNEYS.

UNITED STATES PATENT OFFICE.

AMOS B. SIMONDS, OF YOUNGSTOWN, OHIO.

MEASURING-PUMP.

SPECIFICATION forming part of Letters Patent No. 336,761, dated February 23, 1886.

Application filed June 16, 1885. Serial No. 168,896. (No model.)

*To all whom it may concern:*

Be it known that I, AMOS B. SIMONDS, of Youngstown, in the county of Mahoning and State of Ohio, have invented certain new and useful Improvements in Measuring-Pumps, of which the following is a full, clear, and exact description.

The object of my invention is to provide a new and improved pump for drawing oil from a barrel combined with a measure.

The invention consists in the combination of parts and details, as hereinafter fully described, and pointed out in the claims.

Reference is to be had to the accompanying drawings, forming part of this specification, in which similar letters of reference indicate corresponding parts in both the figures.

Figure 1 is a side view of my improved measuring-pump. Fig. 2 is a longitudinal sectional view of the measuring-vessel.

The pump A is provided with an upwardly-projecting pipe, B, the top of which is curved downward and provided with an apertured ball, C, held in a socket formed in the upper end of a tube, D, held in a vessel, E, provided with a cock, F, in its bottom. The lower end of the tube D is provided with a screen, G, and the tube is surrounded by an annular piston or float, H, having gage-rods J, projecting through the top of the vessel E. A drip-pan, L, is held below the vessel E on the end of a tube, M, projecting from the pump-tube below the pipe B, as shown. The pump is placed in the barrel O and the oil pumped into the vessel E, and as the oil in the vessel rises it raises the float and the rods J show the quantity of oil in the vessel E. A vessel for receiving the oil is placed on the pan L, and the cock F opened to permit the oil to flow from the vessel E into the vessel on the pan L. The drip oil collects on the pan L and flows through the pipe M back into the pump, thus preventing any loss of oil. As the vessel E is suspended by a ball-and-socket joint from the tube B, the liquid in the said vessel E will always be level.

Having thus described my invention, what I claim as new, and desire to secure by Letters Patent, is—

1. The combination, with a pump, of the pipe B, the ball C, the vessel E, the tube D in the vessel E, and having a socket formed on its top for receiving the ball C, substantially as herein shown and described.

2. The combination, with the pump A, of the pipe B, the vessel E, the tube D, the piston H, the rods J, and the cock F, substantially as herein shown and described.

AMOS B. SIMONDS.

Witnesses:
JOHN H. CLARKE,
M. W. JOHNSON.